United States Patent
Oh et al.

(10) Patent No.: US 10,171,152 B2
(45) Date of Patent: Jan. 1, 2019

(54) COMMUNICATION METHOD AND APPARATUS USING SINGLE RADIO FREQUENCY CHAIN ANTENNA

(71) Applicant: ELECTRONICS AND TELECOMMUNICATIONS RESEARCH INSTITUTE, Daejeon (KR)

(72) Inventors: Jung Hoon Oh, Daejeon (KR); Gweon Do Jo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/646,229

(22) Filed: Jul. 11, 2017

(65) Prior Publication Data
US 2018/0227025 A1    Aug. 9, 2018

(30) Foreign Application Priority Data
Feb. 8, 2017   (KR) .................. 10-2017-0017715

(51) Int. Cl.
*H04B 7/06*    (2006.01)
*H04B 7/0413*    (2017.01)

(52) U.S. Cl.
CPC ......... *H04B 7/0617* (2013.01); *H04B 7/0413* (2013.01)

(58) Field of Classification Search
CPC .... H01Q 21/205; H01Q 25/00; H01Q 3/2605; H01Q 19/32; H01Q 21/30; H01Q 3/46;
(Continued)

(56) References Cited

U.S. PATENT DOCUMENTS

| 7,430,440 B2* | 9/2008 | Grandhi | H01Q 1/242 455/562.1 |
| 2003/0146880 A1* | 8/2003 | Chiang | H01Q 1/246 343/853 |

(Continued)

FOREIGN PATENT DOCUMENTS

| KR | 10-2015-0116503 A | 10/2015 |
| KR | 10-2016-0061848 A | 6/2016 |
| KR | 10-2016-0116881 A | 10/2016 |

OTHER PUBLICATIONS

Donghyuk Gwak, et al. "Analysis of Single-RF MIMO Receiver with Beam Switching Antenna", 2015 ETRI.
(Continued)

*Primary Examiner* — Khanh C Tran
(74) *Attorney, Agent, or Firm* — LRK Patent Law Firm

(57) ABSTRACT

A communication method of a wireless device to which a single radio frequency (RF) chain antenna is applied. The wireless device stores a plurality of beam sets for the single RF chain antenna and a plurality of quality values for the plurality of beam sets. The wireless device selects a first beam set having a first quality value that is a best quality value among the plurality of stored beam sets. The wireless device confirms a second quality value for the first beam set using received data when the data are received using the first beam set. The wireless device selects a second beam set different from the first beam set among the plurality of stored beam sets when the second quality value is poorer than the first quality value.

16 Claims, 11 Drawing Sheets

(58) Field of Classification Search
CPC ...... H01Q 21/065; H01Q 19/26; H01Q 19/30; H01Q 1/241; H01Q 21/00; H01Q 21/061; H01Q 21/24; H01Q 23/00; H04B 7/0617; H04B 7/0413; H04B 7/0695; H04B 7/088; H04B 7/0632; H04B 7/318; H04B 17/309; H04B 17/336; H04W 16/28; H04L 1/0003; H04L 1/0025
See application file for complete search history.

(56) References Cited

U.S. PATENT DOCUMENTS

| | | | | |
|---|---|---|---|---|
| 2006/0093055 | A1* | 5/2006 | Goldberg | H01Q 1/241 375/267 |
| 2006/0264184 | A1* | 11/2006 | Li | H01Q 3/24 455/101 |
| 2006/0270343 | A1* | 11/2006 | Cha | H04B 7/0413 455/25 |
| 2007/0165736 | A1* | 7/2007 | Wang | H04B 7/0695 375/267 |
| 2009/0023401 | A1* | 1/2009 | Grandhi | H01Q 1/242 455/101 |
| 2009/0111381 | A1 | 4/2009 | Johnson et al. | |
| 2010/0311457 | A1* | 12/2010 | Johansson | H01Q 1/005 455/517 |
| 2016/0112147 | A1 | 4/2016 | Seo et al. | |
| 2016/0315686 | A1* | 10/2016 | Song | H01Q 3/446 |

OTHER PUBLICATIONS

Gweondo Jo, et al. "LTE based Spatial Multiplexing MIMO with Single Radio", Proceedings of the 46th European Microwave Conference, Oct. 2016.

* cited by examiner

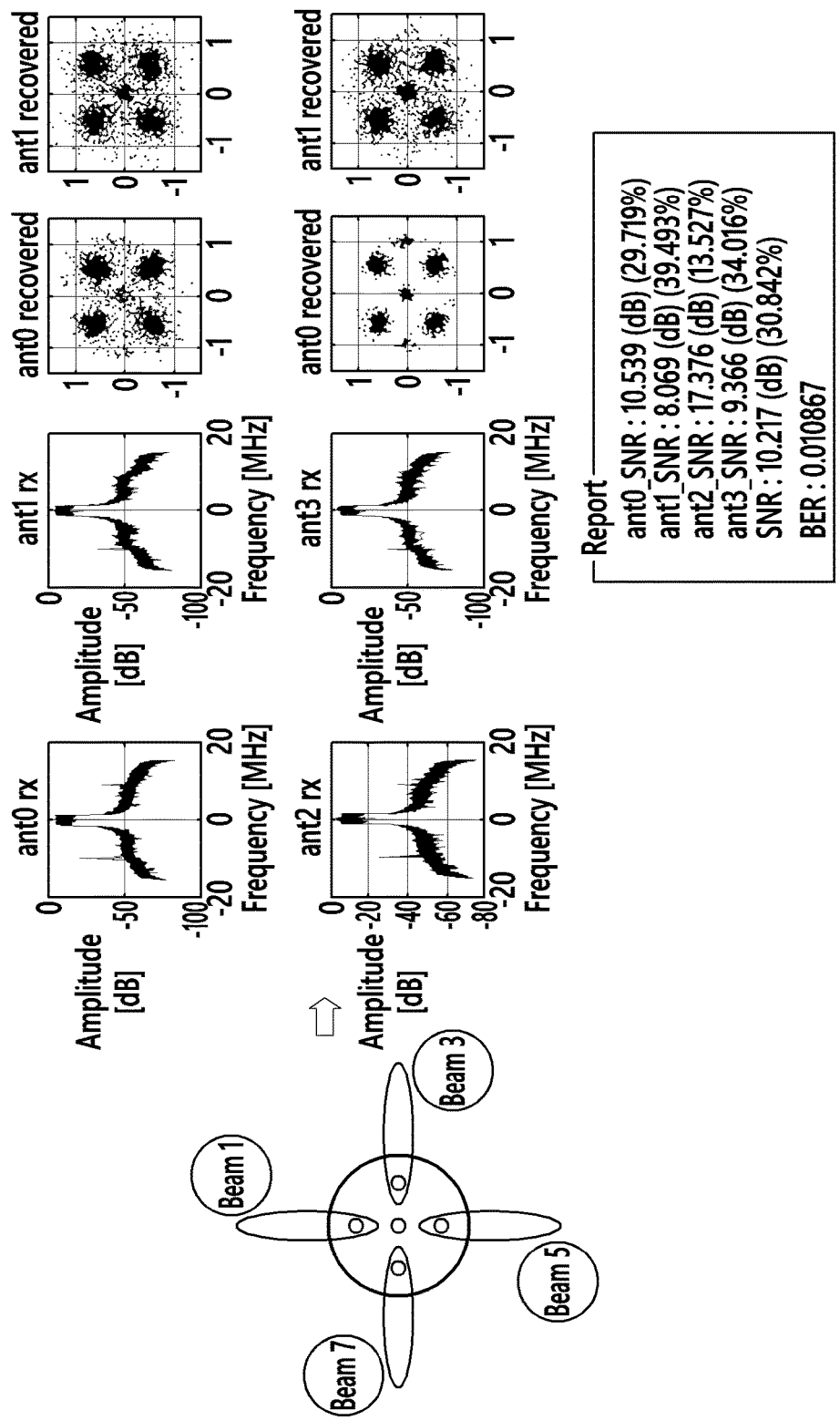

COMMUNICATION METHOD AND APPARATUS USING SINGLE RADIO FREQUENCY CHAIN ANTENNA

CROSS-REFERENCE TO RELATED APPLICATION

This application claims priority to and the benefit of Korean Patent Application No. 10-2017-0017715, filed in the Korean Intellectual Property Office on Feb. 8, 2017, the entire content of which is incorporated herein by reference.

BACKGROUND OF THE INVENTION

1. Field of the Invention

The present invention relates to a single radio frequency (RF) chain antenna and a control method therefor.

In detail, the present invention relates to a method and an apparatus capable of obtaining a multiple input multiple output (MIMO) effect using a single RF chain antenna for large capacity data communication, and a method and an apparatus for controlling the same.

2. Description of Related Art

Many technologies for a large capacity wireless data service are present. In particular, a MIMO technology has been applied to a wireless system (for example, long term evolution (LTE), LTE-advanced (LTE-A), 802.11n, or the like). However, for the large capacity wireless data service, the MIMO technology requires a large number of antennas and increases complexity of a system as many.

To overcome the above problem, it has been suggested theoretically that a MIMO transmission using a single RF chain is possible. Further, a multiple signal may be actually received through the single RF chain and demodulated.

However the single RF chain antenna greatly suffers from a reception influence according to the channel environment, which needs to be improved.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus having advantages of reducing hardware complexity and an antenna volume occurring when a multiple antenna of MIMO is used by using a single RF chain.

Further, the present invention has been made in an effort to provide a method and an apparatus having advantages of overcoming a deterioration of system performance due to a change in channel environment.

An exemplary embodiment of the present invention provides a communication method of a wireless device to which a single radio frequency (RF) chain antenna is applied. The communication method of a wireless device to which a single radio frequency (RF) chain antenna is applied includes: storing a plurality of beam sets for the single RF chain antenna and a plurality of quality values for the plurality of beam sets; selecting a first beam set having a first quality value that is a best quality value among the plurality of stored beam sets; confirming a second quality value for the first beam set using received data when the data are received using the first beam set; and selecting a second beam set different from the first beam set among the plurality of stored beam sets when the second quality value is poorer than the first quality value.

The second beam set may have a second-best quality value after the first quality value among the plurality of stored quality values.

The selecting of the second beam set may include: increasing a value of a counter; and selecting the second beam set when the value of the counter is to smaller than a threshold value.

The storing may include storing the plurality of beam sets and the plurality of quality values in a first table before data communication starts.

The selecting of the second beam set may include modifying the first table when the value of the counter is equal to or greater than the threshold value.

The single RF chain antenna may include a first antenna for data communication and at least two parasitic element antennas and generate a plurality of beams by a switch control for the at least two parasitic element antennas.

When the first parasitic element antenna among the at least two parasitic element antennas serves as a reflector, a first load value for an operation of the reflector may be applied to the first parasitic element antenna by the switch control for the first parasitic element antenna.

When the first parasitic element antenna serves as a director, a second load value for an operation of the director may be applied to the first parasitic element antenna by the switch control for the first parasitic element antenna.

The first quality value may be an error vector magnitude (EVM).

The first beam set may include four beams.

The confirming may include receiving a plurality of symbols within a predetermined time for receiving one symbol by beam switching based on the number of beams included in the first beam set.

Another exemplary embodiment of the present invention provides a wireless device. The wireless device includes: a single radio frequency (RF) chain antenna; and a processor controlling the single RF chain antenna.

The processor may store a plurality of beam sets for the single RF chain antenna and the plurality of quality values for the plurality of beam sets in a first table, select a first beam set having a first quality value among the plurality of beam sets stored in the first table, confirm a second quality value for the first beam set using data received through the first beam set, and select a second beam set different from the first beam set among the plurality of beam sets stored in the first table when the second quality value is poorer than the first quality value.

Still another exemplary embodiment of the present invention provides a communication method of a wireless device to which a single radio frequency (RF) chain antenna is applied. The communication method of a wireless device to which a single radio frequency (RF) chain antenna is applied includes: selecting a first beam set having a first quality value among the plurality of beam sets for the single RF chain antenna; generating beams included in the first beam set by a switch control for parasitic element antennas included in the single RF chain antenna; and receiving a plurality of symbols within one symbol reception time by beam switching based on beams included in the first beam set.

BRIEF DESCRIPTION OF THE DRAWINGS

FIGS. 5A and 5B are diagrams illustrating recovered data constellation depending on a beam selection according to an exemplary embodiment of the present invention.

DETAILED DESCRIPTION OF THE EMBODIMENTS

Figure 1:
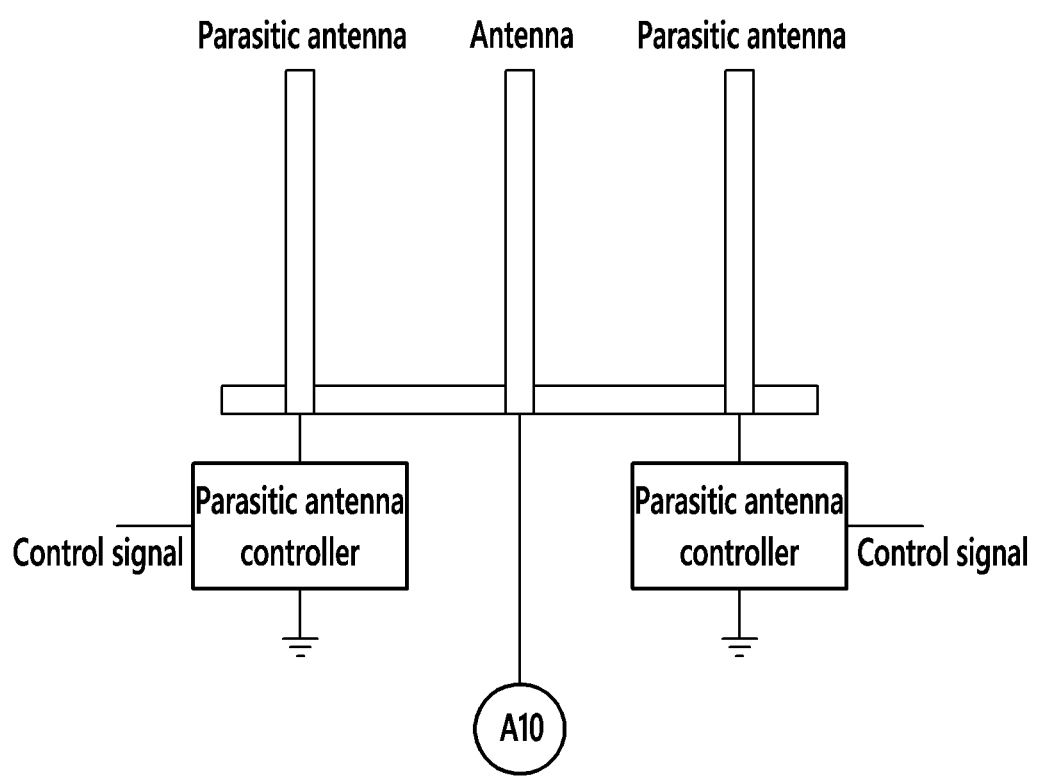
FIG. 1 is a diagram illustrating a structure of a single RF chain antenna according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, the overlapping description of the same components will be omitted.

Further, in the present specification, it is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, in the present specification, a terminal may refer to a mobile terminal, a mobile station, an advanced mobile station, a high reliability mobile station, a subscriber station, a portable subscriber station, an access terminal, user equipment, and the like and may also include all or some of the functions of the mobile terminal, the mobile station, the advanced mobile station, the high reliability mobile station, the subscriber station, the portable subscriber station, the access terminal, the user equipment, and the like.

Further, in the present specification, a base station (BS) may refer to an advanced base station, a high reliability base station (HR-BS), a nodeB (NB), an evolved node B (eNodeB, eNB), an access point, a radio access station, a base transceiver station, a mobile multihop relay (MMR)-BS, a relay station serving as a base station, a high reliability relay station serving as a base station, a repeater, a macro base station, a small base station, and the like and may also include all or some of functions of the advanced base station, the HR-BS, the nodeB, the eNodeB, the access point, the radio access station, the base transceiver station, the MMR-BS, the relay station, the high reliability relay station, the repeater, the macro base station, the small base station, and the like.

In the present specification, an LTE system using orthogonal frequency division multiplexing (OFDM) is taken as an example and an operation of a single RF chain based system will be described. However, this is only example and an exemplary embodiment of the present invention may be applied even to a system using a waveform different from the OFDM.

To obtain information of channels independent from each other, a typical multiple antenna system needs to maintain an independent channel by separating an antenna gap at ½ or more of a data carrier frequency. However, to obtain the independent channel information, the single antenna system based on the single RF chain acquires information by switching a beam within a received data symbol gap.

The single RF chain antenna will be described with reference to FIGS. 1 to 3.

FIG. 1 is a diagram illustrating a structure of a single RF chain antenna according to an exemplary embodiment of the present invention. FIG. 2 is a diagram illustrating a parasitic antenna controller of the single RF chain antenna according to an exemplary embodiment of the present invention. FIG. 3 is a diagram illustrating a method for forming a beam by a control of the single RF chain antenna according to the exemplary embodiment of the present invention.

As illustrated in FIG. 1, the single RF chain antenna includes one antenna for data communication and at least two parasitic element antennas (hereinafter, 'parasitic antenna'). In the present specification, an exemplary embodiment of the present invention will describe, by way of example, the case where the single RF chain antenna includes four parasitic antennas. Further, the single RF chain antenna may further include a parasitic antenna controller for controlling a parasitic antenna based on a control signal.

Figure 2:
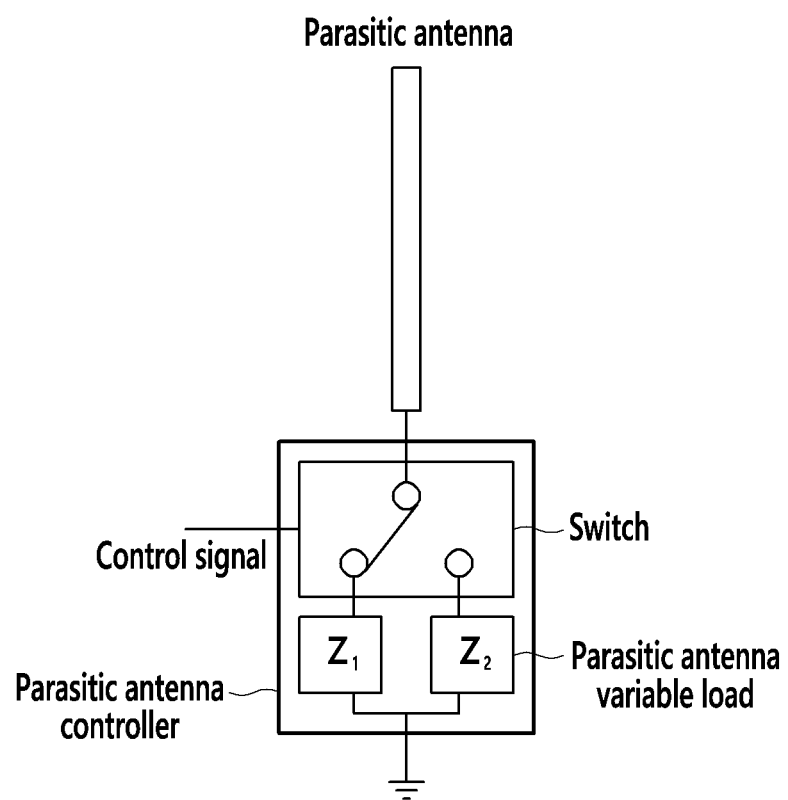
FIG. 2 is a diagram illustrating a parasitic antenna controller of the single RF chain antenna according to an exemplary embodiment of the present invention.

As illustrated in FIG. 2, the parasitic antenna included in the single RF chain antenna serves as a reflector and a director for beam formation and selects load values fitting operations (for example, operation of the reflector and an operation of the director) by a switch control. For example, the parasitic antenna controller includes a switch controlled depending on the control signal. When the parasitic antenna serves as the reflector, a variable load value (for example, $Z_1$) for the operation of the reflector may be applied to the parasitic antenna by the switch control for the parasitic antenna. When the parasitic antenna serves as the director, a variable load value (for example, $Z_2$) for the operation of the director may be applied to the parasitic antennal by the switch control for the parasitic antenna.

Figure 3:
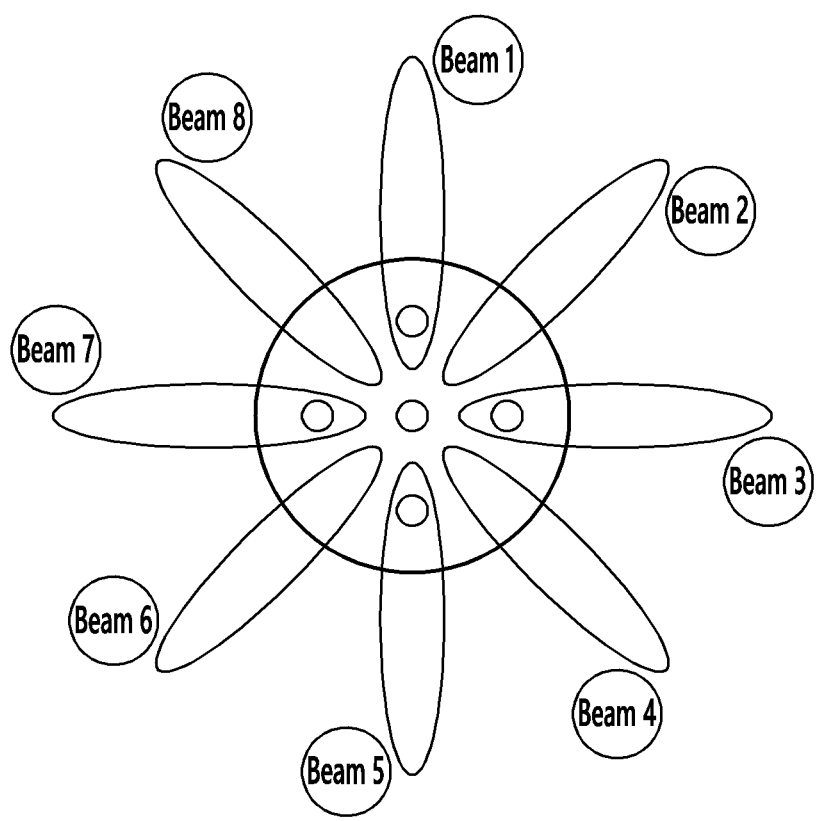
FIG. 3 is a diagram illustrating a method for forming a beam by a control of the single RF chain antenna according to the exemplary embodiment of the present invention.

As illustrated in FIG. 3, when the number of parasitic antennas included in the single RF chain antenna is 4, the single RF chain antenna may form at least eight beams (for example, beam No. 1, beam No. 2, . . . ,beam No. 8) by the switch control for the parasitic antenna. For example, for the single RF chain antenna to generate beam No. 3, the parasitic antenna corresponding to a direction of beam No. 3 selects a load value for serving as the director and the remaining seven parasitic antennas select a load value for serving as the reflector.

Figure 4A:
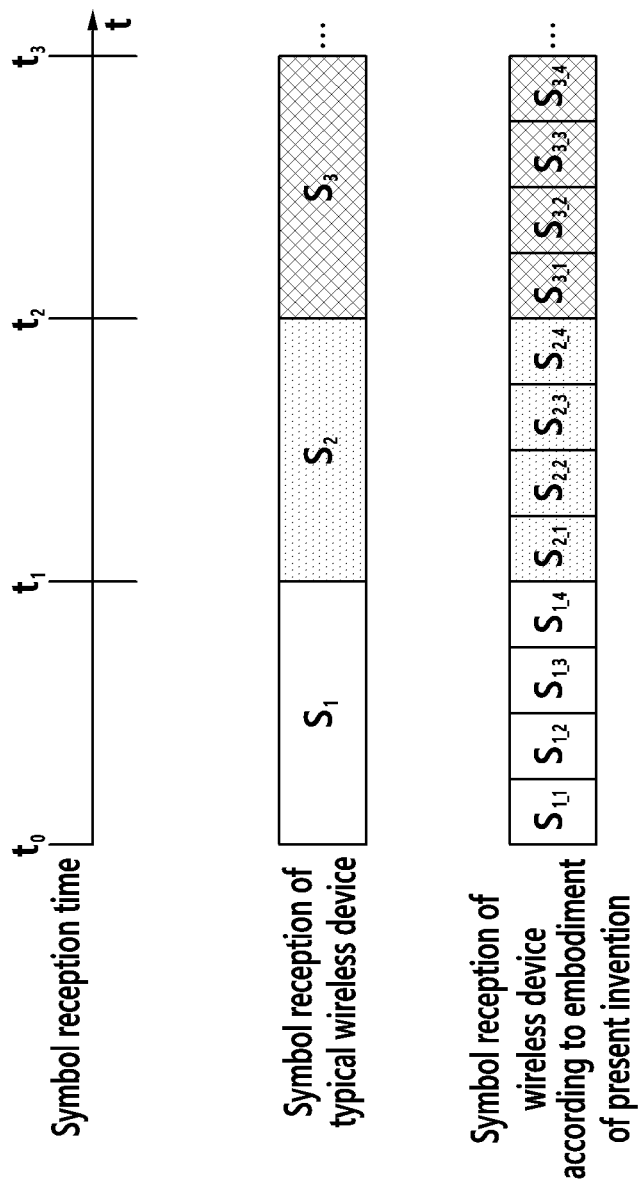
FIG. 4A is a diagram illustrating a method for operating a beam to allow a single RF chain antenna to perform a multiple antenna role according to an exemplary embodiment of the present invention.
Figure 4B:
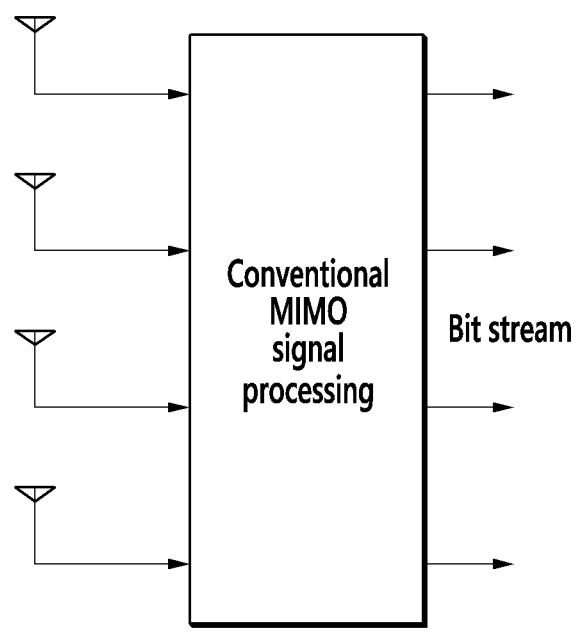
FIG. 4B is a diagram illustrating a typical MIMO system.

FIG. 4A is a diagram illustrating a method for operating a beam to allow a single RF chain antenna to perform a multiple antenna role according to an exemplary embodiment of the present invention. Further, FIG. 4B is a diagram illustrating a typical MIMO system and FIG. 4C is a diagram illustrating a filter according to an exemplary embodiment of the present invention.

In detail, FIG. 4A illustrates a method for acquiring different four channel information by switching a beam (or selecting a beam) four times within one symbol reception time. For example, a typical wireless device receives one symbol (for example, $S_1$) within one symbol reception time (for example, period from $t_0$ to $t_1$), but the wireless device to which the single RF chain antenna according to the exemplary embodiment of the present invention is applied may receive symbols (for example, $S_{1\_1}$, $S_{1\_2}$, $S_{1\_3}$, $S_{1\_4}$) suffering from different four channel environments by switching a beam four times within one symbol reception time (for example, period from $t_0$ to $t_1$) instead of the symbol (for example, $S_1$). Similarly, the typical wireless device receives one symbol (for example, $S_2$) within one symbol reception time (for example, period from $t_1$ to $t_2$), but the wireless device to which the single RF chain antenna according to the exemplary embodiment of the present invention is applied may receive symbols (for example, $S_{2\_1}$, $S_{2\_2}$, $S_{2\_3}$, $S_{2\_4}$) suffering from different four channel environments within one symbol reception time (for example, period from $t_1$ to $t_2$) instead of the symbol (for example, $S_2$). Similarly, the typical wireless device receives one symbol (for example, $S_3$) within one symbol reception time (for example, period from $t_2$ to $t_3$), but the wireless device to which the single RF chain antenna according to the exemplary embodiment of the present invention is applied may receive symbols (for example, $S_{3\_1}$, $S_{3\_2}$, $S_{3\_3}$, $S_{3\_4}$) suffering from different four channel environments within one symbol reception time (for example, period from $t_2$ to $t_3$) instead of the symbol (for example, $S_3$). In this way, the same effect as the case where general four antennas are used may be acquired.

Figure 4C:
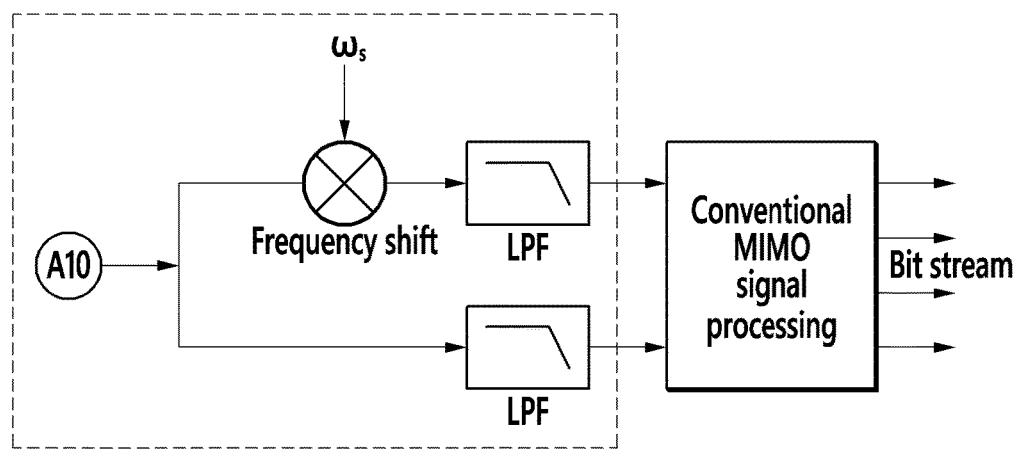
FIG. 4C is a diagram illustrating a filter according to an exemplary embodiment of the present invention.

Meanwhile, the four symbols (for example, $S_{1\_1}$, $S_{1\_2}$, $S_{1\_3}$, $S_{1\_4}$) received through the beam switching may be separated into data suffering from the independent channel environment by the filter illustrated in FIG. 4C. The following process is the same as or similar to the typical process of MIMO reception (for example, MIMO signal processing illustrated in FIG. 4B) and recovers data. In detail, as illustrated in FIG. 4C, the signal received through the single RF chain antenna of FIG. 1 is divided into two, one of the two signals is input to a low-pass filter (LPF), and the remaining one suffers from a frequency shift based on $\omega_s$ and then is input to the LPF. Here, a beam switching frequency bandwidth is (sampling frequency for an LTE bandwidth)× (the number of data streams) and the wireless device performs the frequency shift $\omega_s$ within the beam switching frequency bandwidth to extract data suffering from different channel environments. For example, a sampling frequency for an LTE signal having a 3 MHz bandwidth becomes 3.84 MHz and a beam switching frequency for 2×2 MIMO becomes (3.84 MHz)×2=7.68 MMz. To extract data by the reception switching, the wireless device may perform the frequency shift $\omega_s$ by +3.84 MHz and −3.84 MHz to extract the data suffering from different channel environments.

As another example, a sampling frequency for an LTE signal having a 3 MHz bandwidth becomes 3.84 MHz and a beam switching frequency for 4×4 MIMO becomes (3.84 MHz)×4=15.36 MMz. To extract data by the reception switching, the wireless device may perform the frequency shift $\omega_s$ by +3.84 MHz, −3.84 MHz, +7.68 MHz, and −7.68 MHz to extract the data suffering from different channel environments.

Figure 4D:
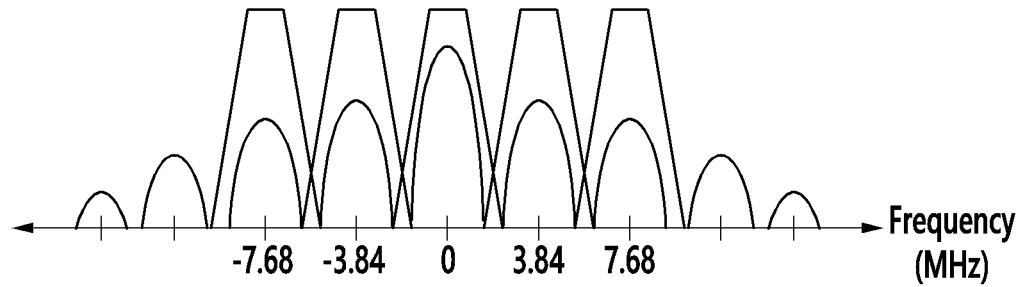
FIG. 4D is a diagram illustrating a method for extracting data suffering from different channel environments by a frequency shift according to an exemplary embodiment of the present invention.

FIG. 4D is a diagram illustrating a method for extracting data suffering from different channel environments by a frequency shift according to an exemplary embodiment of the present invention.

Figure 5B:
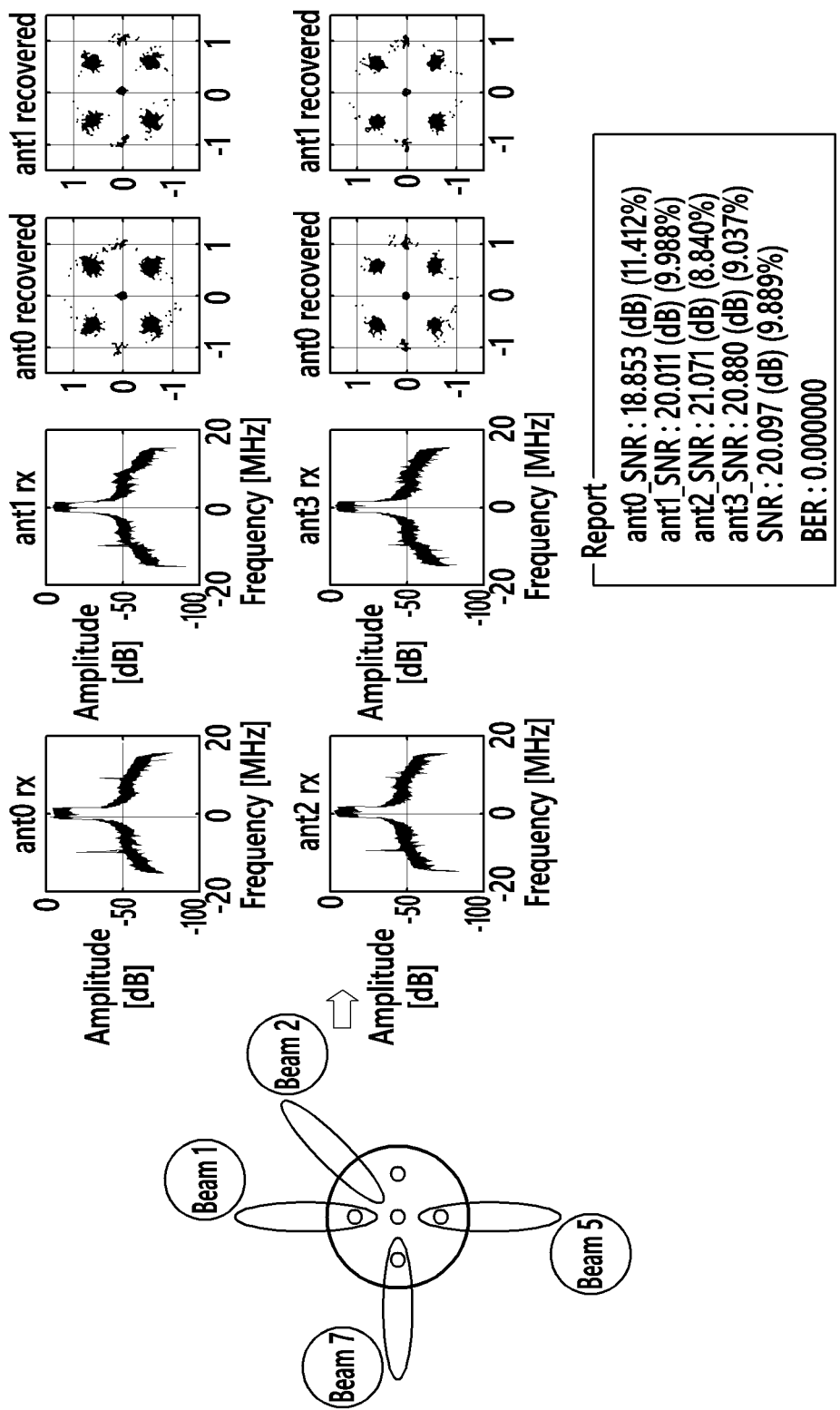

FIGS. 5A and 5B are diagrams illustrating recovered data constellation depending on a beam selection according to an exemplary embodiment of the present invention.

In detail, FIG. 5A illustrates the case where four beams (for example, beam No. 1, beam No. 3, beam No. 5, beam No. 7) are selected by the beam switching and FIG. 5B illustrates the case where four beams (for example, beam No. 1, beam No. 2, beam No. 5, beam No. 7) are selected by the beam switching.

FIGS. 5A and 5B illustrate a signal to noise ratio (SNR) value and a bit error rate (BER) value.

As illustrated in FIGS. 5A and 5B, the recovered data depending on the beam selection may have constellation having poor performance.

The problem arises when the independent channel is not acquired by the beam switching (or beam selection). The operation and management method for overcoming the problem will be described with reference to FIG. 6.

Figure 6:
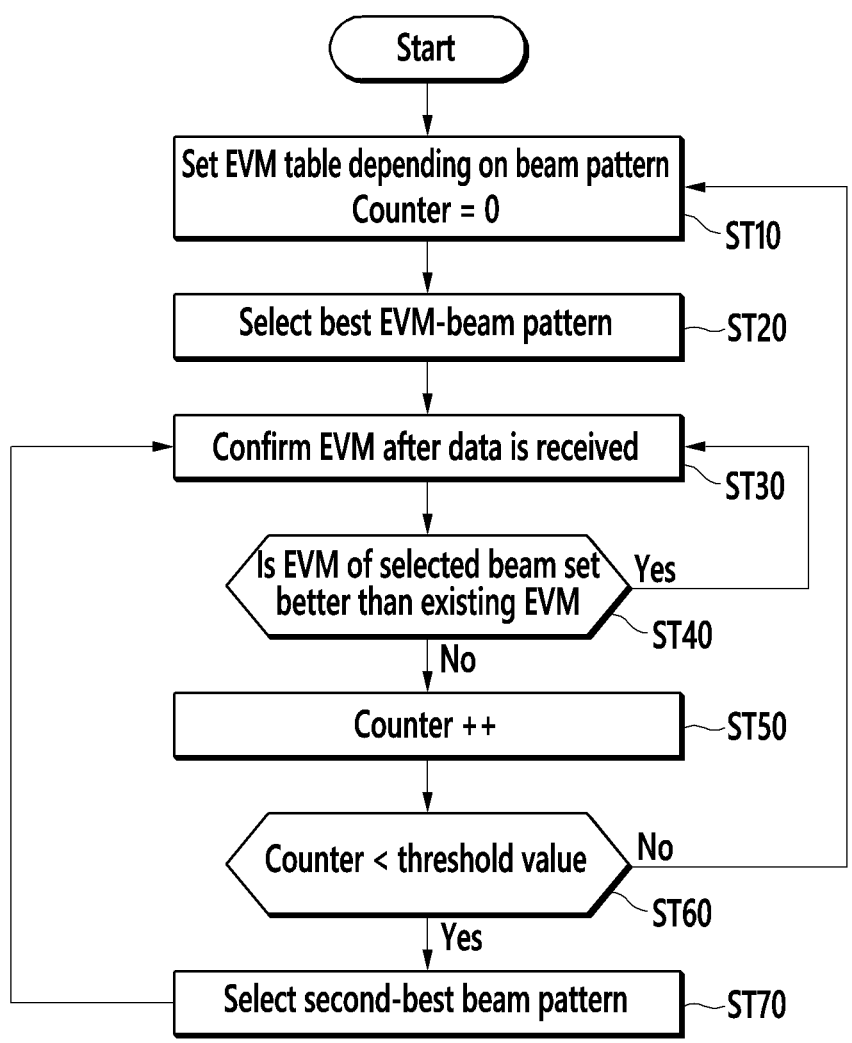
FIG. 6 is a diagram illustrating a method for controlling beam switching for a single RF chain antenna according to the exemplary embodiment of the present invention.

FIG. 6 is a diagram illustrating a method for controlling beam switching for a single RF chain antenna according to the exemplary embodiment of the present invention. A counter illustrated in FIG. 6 is a register for storing a frequency in which an error vector magnitude (EVM) acquired during a general management is out of a desired EVM. For example, the counter may be set to be 0 initially. A threshold value illustrated in FIG. 6 may be determined randomly.

The single RF chain antenna having four parasitic elements (parasitic antennas) may generate at least eight beams by parasitic element switching (parasitic antenna switching).

The wireless device to which the single RF chain antenna is applied sets an EVM table depending on a beam pattern (ST10). Specifically, when the wireless device to which the single RF chain antenna is applied combines four of eight beams in the early stage prior to starting data communication, the wireless device obtains the EVM (or SNR) value from the data constellation and generates a table (EVM table) storing the EVM for a beam set. The EVM table may store a plurality of beam sets for the single RF chain antenna and a plurality of EVMs for the plurality of beam sets. Here, one beam set includes four beams and beam patterns.

The wireless device to which the single RF chain antenna is applied selects the best EVM-beam pattern (ST20). In detail, the wireless device to which the single RF chain antenna is applied may select the beam set having the minimum EVM among the beam sets stored in the EVM table.

The system is managed based on the selected beam set in the ST20. In detail, the wireless device to which the single RF chain antenna is applied may receive data using the beam set selected in the ST20. The wireless device to which the single RF chain antenna is applied may generate beams of the selected beam set by the switch control for the parasitic element antennas included in the single RF chain antenna. For example, the wireless device to which the single RF chain antenna is applied may receive a plurality of symbols (for example, $S_{1\_1}$, $S_{1\_2}$, $S_{1\_3}$, $S_{1\_4}$) within one symbol reception time (for example, period from $t_0$ to $t_1$) by the beam switching (for example, beam switching based on the beams included in the selected beam set) illustrated in FIG. 4A. Further, the wireless device to which the single RF chain antenna is applied may confirm the EVM for the selected beam set by using the received data (for example, data acquired from the plurality of received symbols) (ST30).

If the channel environment is changed, the EVM for the selected beam set may be changed. If the EVM confirmed in the ST30 for the selected beam set is poorer than the EVM (i.e., EVM stored in the EVM table for the selected beam set) previously included in the selected beam set, in ST40, the wireless device to which the single RF chain antenna is applied selects the beam set having the second-best EVM after the currently selected EVM among the beam sets stored in the EVM table without modifying the EVM table on the whole (ST50, ST60, and ST70).

For example, if it is assumed that the currently selected EVM is the minimum EVM among the EVMs stored in the EVM table, the wireless device to which the single RF chain antenna is applied may select the beam set having the second-lowest EVM after the minimum EVM among the beam sets stored in the EVM table if the EVM confirmed in the ST30 is larger than the currently selected EVM. This is an operation of overcoming the problem in that it takes much time to modify the EVM table on the whole and an operation of rapidly supplementing system performance.

The wireless device to which the single RF chain antenna is applied increases a value of a counter every time the beam set is changed (ST50). When the value of the counter exceeds a predetermined threshold value, in the ST60, the wireless device to which the single RF chain antenna is applied modifies the EVM table (for example, a plurality of quality values stored for the plurality of beam sets) on the whole (ST10).

Meanwhile, FIG. 6 illustrates the case where quality information (or quality value) is the EVM, which is only example. Even when the quality information (or quality value) different from the EVM is used, the exemplary embodiment of the present invention may be applied.

Figure 7:
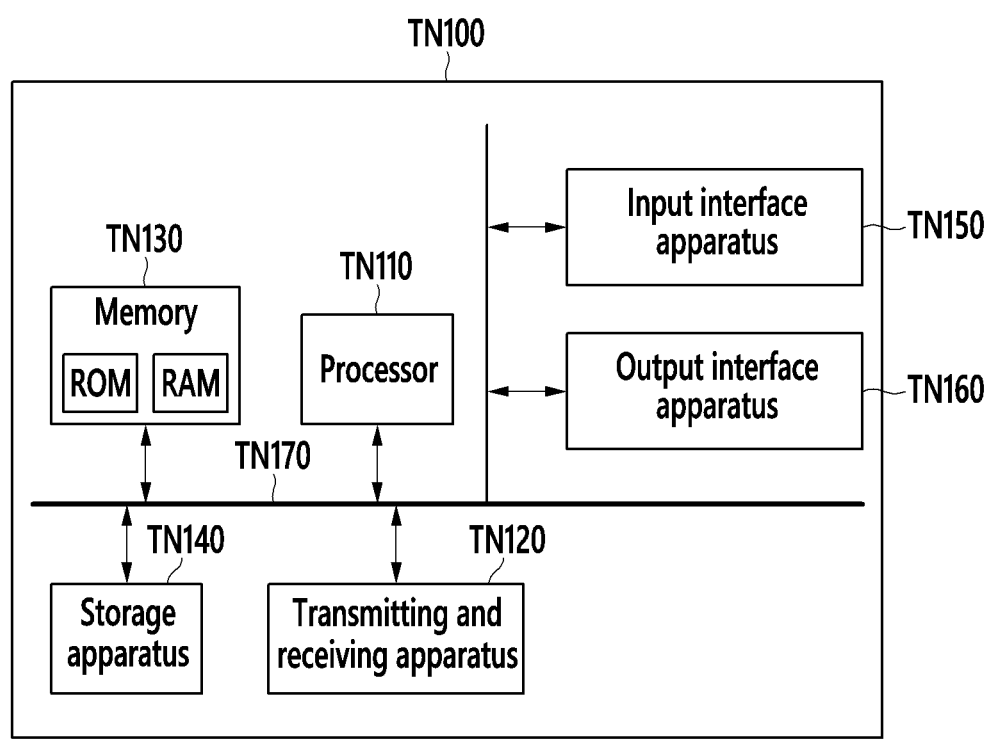
FIG. 7 is a diagram illustrating a computing device according to an exemplary embodiment of the present invention.

FIG. 7 is a diagram illustrating a computing device according to an exemplary embodiment of the present invention.

A computing device TN100 of FIG. 7 may be the wireless device, a base station, a terminal, or the like that are described in the present specification. Alternatively, the computing device TN100 of FIG. 7 may be a communication node, a transmitter, or a receiver.

In the exemplary embodiment of FIG. 7, the computing device TN100 may include at least one processor TN110, a transmitting/receiving apparatus TN120 connected to a network to perform communication, and a memory TN130. Further, the computing device TN100 may further include a storage apparatus TN140, an input interface apparatus TN150, an output interface apparatus TN160, or the like. Components included in the computing device TN100 may be connected to each other by a bus TN170 to communicate with each other.

The processor TN110 may run a program command that is stored in at least one of the memory TN130 and the storage apparatus TN140. The processor TN110 may mean a central processing unit (CPU), a graphics processing unit (GPU), or an exclusive processor that performs methods according to exemplary embodiments of the present invention. The processor TN110 may be configured to implement the procedures, the functions, and the methods described with reference to the exemplary embodiment of the present invention. The processor TN110 may control each of the components of the computing device TN100. For example, if it is assumed that the computing device TN100 is the wireless device to which the single RF chain antenna is applied, when the processor TN110 controls the parasitic element antenna included in the single RF chain antenna to serve as the reflector, the load value for the operation of the reflector may be applied to the parasitic element antenna by the switch control for the parasitic element antenna. When the processor TN110 controls the parasitic element antenna to serve as the director, the load value for the operation of the director may be applied to the parasitic element antenna by the switch control for the parasitic element antenna.

The memory TN130 and the storage apparatus TN140 may each store various information associated with the operation of the processor TN110. The memory TN130 and the storage device TN140 may each be configured of at least one of a volatile storage medium and a non-volatile storage medium. For example, the memory TN130 may be configured of at least one of a read only memory (ROM) and a random access memory (RAM).

The transmitting/receiving apparatus TN120 may transmit or receive a wired signal or a wireless signal.

According to an exemplary embodiment of the present invention, it is possible to obtain the multiple antenna effect using the single RF chain antenna.

Further, according to an exemplary embodiment of the present invention, it is possible to reduce the hardware complexity and to be implemented with less components to be excellent even in the price.

Further, according to an exemplary embodiment of the present invention, it is possible to reduce the hardware volume.

According to an exemplary embodiment of the present invention, it is possible to overcome the deterioration of system performance using the single RF chain antenna.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A communication method of a wireless device to which a single radio frequency (RF) chain antenna is applied, the communication method comprising:
storing a plurality of beam sets for the single RF chain antenna and a plurality of quality values for the plurality of beam sets;
selecting a first beam set having a first quality value that is a best quality value among the plurality of stored beam sets;
confirming a second quality value for the first beam set using received data when the data are received using the first beam set; and
selecting a second beam set different from the first beam set among the plurality of stored beam sets when the second quality value is poorer than the first quality value,
wherein the confirming includes receiving a plurality of symbols within a predetermined time for receiving one symbol by beam switching based on the number of beams included in the first beam set.

2. The communication method of claim 1, wherein the second beam set has a second-best quality value after the first quality value among the plurality of stored quality values.

3. The communication method of claim 1, wherein the selecting of the second beam set includes:
increasing a value of a counter; and
selecting the second beam set when the value of the counter is smaller than a threshold value.

4. The communication method of claim 3, wherein:
the storing includes storing the plurality of beam sets and the plurality of quality values in a first table before data communication starts, and
the selecting of the second beam set includes modifying the first table when the value of the counter is equal to or greater than the threshold value.

5. The communication method of claim 1, wherein the single RF chain antenna includes a first antenna for data communication and at least two parasitic element antennas and generates a plurality of beams by a switch control for the at least two parasitic element antennas.

6. The communication method of claim 5, wherein:
when a first parasitic element antenna among the at least two parasitic element antennas serves as a reflector, a first load value for an operation of the reflector is applied to the first parasitic element antenna by the switch control for the first parasitic element antenna, and
when the first parasitic element antenna serves as a director, a second load value for an operation of the director is applied to the first parasitic element antenna by the switch control for the first parasitic element antenna.

7. The communication method of claim 1, wherein:
the first quality value is an error vector magnitude (EVM), and
the first beam set includes four beams.

8. A wireless device comprising:
a single radio frequency (RF) chain antenna; and
a processor controlling the single RF chain antenna,
wherein the processor:
stores a plurality of beam sets for the single RF chain antenna and a plurality of quality values for the plurality of beam sets in a first table, selects a first beam set having a first quality value among the plurality of beam sets stored in the first table, confirms a second quality value for the first beam set using data received through the first beam set, and selects a second beam set different from the first beam set among the plurality of beam sets stored in the first table when the second quality value is poorer than the first quality value,
applies a first load value for an operation of a reflector to a first parasitic element antenna by a switch control for the first parasitic element antenna when the first parasitic element antenna among parasitic element antennas included in the single RF chain antenna is controlled to serve as the reflector, and
applies a second load value for an operation of a director to the first parasitic element antenna by the switch control for the first parasitic element antenna when the first parasitic element antenna is controlled to serve as the director.

9. The wireless device of claim 8, wherein the processor generates beams included in the first beam set by a switch control for at least two parasitic element antennas included in the single RF chain antenna when data are received through the first beam set.

10. The wireless device of claim 8, wherein the processor receives a plurality of symbols within a predetermined time for receiving one symbol by beam switching based on beams included in the first beam set when data are received through the first beam set.

11. The wireless device of claim 8, wherein:
the first quality value is a best quality value among the plurality of quality values stored in the first table, and
the second beam set has a second-best quality value after the first quality value among the plurality of quality values stored in the first table.

12. The wireless device of claim 8, wherein the processor:
increases a value of a counter when the second quality value is poorer than the first quality value,
selects the second beam set when the value of the counter is smaller than a threshold value, and
modifies the first table when the value of the counter is equal to or greater than the threshold value.

13. The wireless device of claim 8, wherein:
the first quality value is an error vector magnitude (EVM), and
the first beam set includes four beams.

14. A communication method of a wireless device to which a single radio frequency (RF) chain antenna is applied, the communication method comprising:
selecting a first beam set having a first quality value among a plurality of beam sets for the single RF chain antenna;
generating beams included in the first beam set by a switch control for parasitic element antennas included in the single RF chain antenna;
receiving a plurality of symbols within one symbol reception time by beam switching based on the beams included in the first beam set,
confirming a second quality value for the first beam set using data acquired from the plurality of symbols; and
selecting a second beam set different from the first beam set among the plurality of beam sets based on a value of a counter when the second quality value is poorer than the first quality value,
wherein the selecting of the second beam set includes:
increasing the value of the counter when the second quality value is poorer than the first quality value; and
modifying a plurality of quality values stored for the plurality of beam sets when the value of the counter is equal to or greater than a threshold value.

15. The communication method of claim 14, wherein:

when a first parasitic element antenna among the parasitic element antennas included in the single RF chain antenna serves as a reflector, a first load value for an operation of the reflector is applied to the first parasitic element antenna by the switch control for the first parasitic element antenna, and when the first parasitic element antenna serves as a director, a second load value for an operation of the director is applied to the first parasitic element antenna by the switch control for the first parasitic element antenna.

16. The communication method of claim 14, wherein:

the first quality value is a best quality value among a plurality of quality values stored for the plurality of beam sets, and the second beam set has a second-best quality value after the first quality value among the plurality of quality values.

* * * * *